Oct. 11, 1938.　　　G. INNES　　　2,133,143
PICK-UP MECHANISM
Filed Nov. 17, 1937　　2 Sheets-Sheet 2
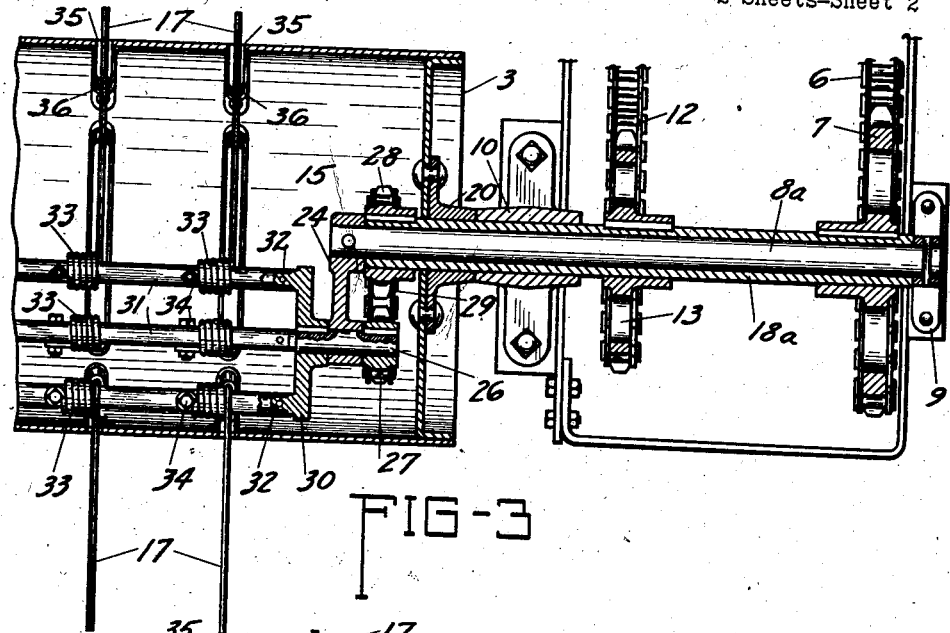
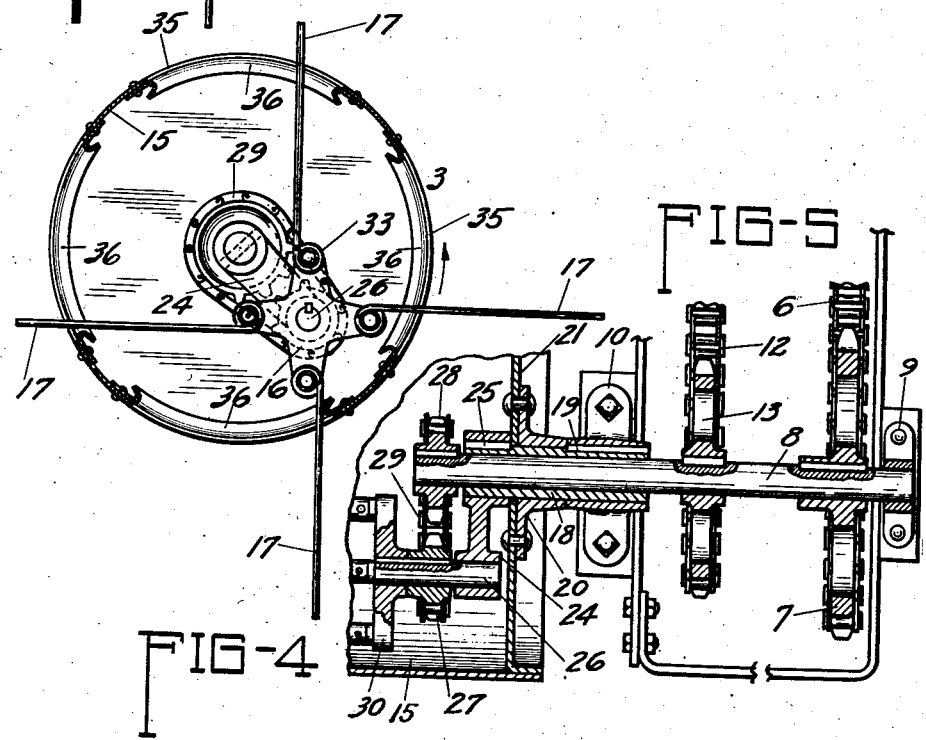
GEORGE INNES INVENTOR.
BY Merrill M. Blackburn
ATTORNEY.

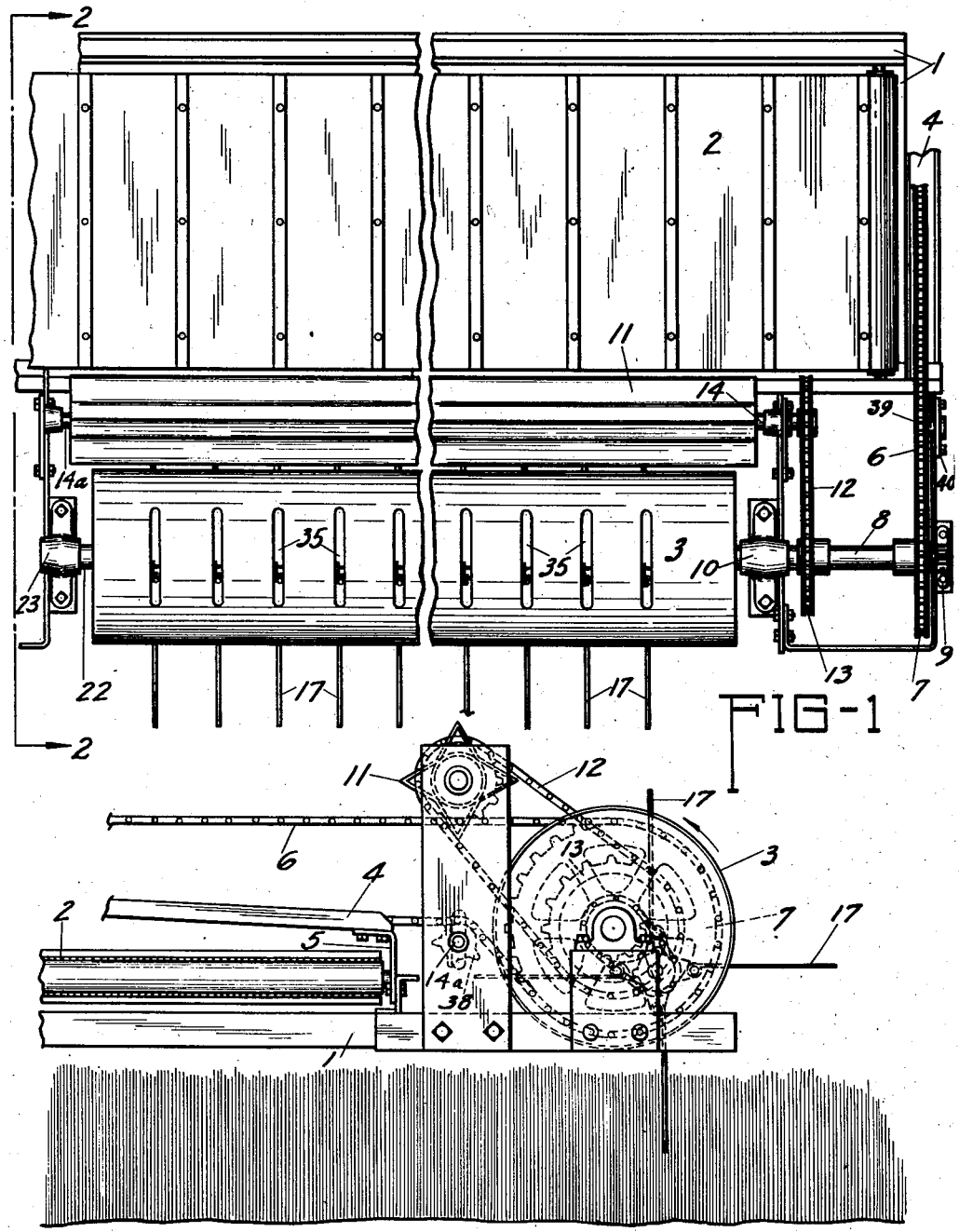

Patented Oct. 11, 1938

2,133,143

UNITED STATES PATENT OFFICE 2,133,143

PICK-UP MECHANISM

George Innes, Davenport, Iowa, assignor to Innes Company, Bettendorf, Iowa, a corporation of Delaware

REISSUED

SEP 17 1940

Application November 17, 1937, Serial No. 175,064

8 Claims. (Cl. 56—364)

The present invention relates to harvesting machinery and more particularly to pick-up mechanism for gathering vegetation which has been severed and left lying upon the ground. Of course this can be used with a cutter mechanism so that the cutting and gathering will both be performed as parts of the same operation.

It is found that in rice fields a pick-up with rigid fingers has a tendency to gather and convey over to the apron or conveyor belt stones and chunks of dirt. This is thoroughly undesirable and it is the primary purpose of this invention to overcome this objectionable feature of prior machines. Other objects of this invention are the provision of an improved rotary means for picking up the cut vegetation; the provision of improved means for rotating the pick-up unit; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, and an alternative form thereof, I desire this disclosure to be understood as illustrative only and not to be interpreted in a limiting sense.

In the drawings annexed hereto and forming a part hereof,

Fig. 1 represents a broken fragmentary view, in plan, of a construction embodying my present invention;

Fig. 2 represents a side elevation taken from the left side of Fig. 1, as indicated by the arrows 2—2;

Fig. 3 represents a longitudinal section through the pick-up unit in the plane defined by the axis of the drum and the axis of the cage;

Fig. 4 represents a vertical transverse section through the pick-up unit;

Fig. 5 is similar to the right hand portion of Fig. 3 and represents the preferred embodiment of this construction.

Reference will now be made in greater detail to the annexed drawings for a more complete description of this invention. A frame 1 is supported on suitable carrying wheels, not shown, and has an apron or conveyor canvas 2, to which the grain is delivered after it has been picked up by the pick-up unit 3. At one end of the frame is a trough 4 supported on suitable brackets 5 attached to the frame. A driving chain 6 connects the source of power with a sprocket wheel 7 mounted on a driving shaft 8, which drive shaft is supported by suitable bearing elements 9 and 10. A device 11 for carrying the vegetation from the pick-up 3 to the apron 2 is rotated by a chain 12 running over a sprocket 13 on the shaft 8.
This device 11, referred to herein as a slinger, is carried on a shaft 14 mounted in suitable brackets adjacent the ends of the shaft.

The pick-up unit 3 comprises a drum 15 and cage 16 having spring fingers 17, together with operating means for the cage. As shown in Fig. 5
5, the sprocket wheels 7 and 13, in the preferred form of this construction, are secured directly to the shaft 8. Therefore, when the chain 6 is driven from the source of power, the shaft 8 is rotated, driving the chain 12 and, through this, the slinger
11. A sleeve 18 surrounds the shaft 8 and is keyed, as shown at 19, to the bearing unit 10. If desired, any suitable form of roller or ball bearing may be inserted between the sleeve 18 and the shaft 8. A collar 20 is rotatably mounted on the sleeve 18 and is secured to the end 21 of the drum 15. This furnishes a bearing for the drum on the sleeve. If desired, suitable bearing elements may be inserted between the collar 20 and sleeve 18, although this is regarded as unnecessary because the rate and amount of rotation between these two is comparatively slight. The opposite end of the drum is supported by a suitable shaft 22 and bearing 23.

A bracket or arm 24 is keyed to the sleeve 18 by a key 25 and it is therefore apparent that since the sleeve is held stationary by the key 19 the bracket or arm 24 will also be held stationary and at the proper angle, once it is properly set. This bracket 24 has a shaft 26 rotatably mounted therein and this shaft 26 cooperates with a like shaft at the opposite end of cage 16 in supporting the latter in proper position within the drum 15. Sprockets 27 and 28 are respectively mounted on the shafts 26 and 8 and are located in the same plane, the sprockets being keyed to their respective shafts and connected by means of a chain 29. Therefore, rotation of the shaft 8 causes rotation of the shaft 26 and the cage 16, which is keyed to the shaft 26.

The cage comprises a pair of ends 30 and a plurality of tubular bars 31, the ends of which surround lugs 32, projecting inwardly from and formed on the inner faces of the ends 30. These bars are pinned to the lugs 32 and are therefore incapable of rotation about them. The spring fingers 17 are formed at their inner ends into coils 33 which are rigidly secured to the bars 31 by means of bolts 34. Openings 35, formed in the peripheral wall of the drum 15, have reenforcements 36 surrounding them and secured to the inside of the drum wall. These not only reenforce the drum but furnish a smooth surface to be engaged by the fingers 17 which project through the openings, as shown clearly in Figs. 3 and 4.

It is apparent from the foregoing that the drum, being free to rotate, will be driven by the fingers of the cage as the latter rotates about its axis. It is also apparent that if the spring fingers strike obstructions, such as stones and clods of earth, they will yield and slide past them so that such materials will not be picked up with the rice or other vegetation which is being gathered. It is also apparent that the slinger 11 will receive the cut vegetation picked up by the pick-up 3 and throw it on the apron 2 to be delivered to that part of the mechanism to which this apron is to carry the grain.

A sprocket 38 is held adjustably by a nut and bolt 39 upon an upright 40 which is slotted for the reception of the bolt 39 and to permit vertical adjustment of the sprocket 38 so as to carry the chain above the trough 4 and also keep the chain adjusted to a proper tightness.

In the structure shown in Figs. 1 to 4, inclusive, a sleeve 18a, corresponding to sleeve 18 in Fig. 5, extends from the outer bearing 9 to a point inside of the drum. In this form, the shaft 8 is designated 8a because it differs slightly from the shaft shown in Fig. 5. It will be seen from Fig. 3 that the shaft 8a is secured to the bearing member 9 and therefore does not rotate therein. The bracket 24 is pinned to the opposite end of the shaft 8a and is therefore held in a rigid position because of the shaft being held rigidly. It is apparent from this figure that the sprocket 7 is keyed to the sleeve 18a instead of to the shaft, as in the previously described construction. Also, the sprocket 13 is keyed to the sleeve 18a which is free to rotate in the bearing member 10, under the influence of the chain 6 and sprocket 7. In this form of construction, the drum 15 is free to rotate on the sleeve 18a, just as in the previously described construction. In this construction, the sprocket 28 is keyed to the sleeve 18a instead of to the shaft, as in the structure previously described. The operation of this device is substantially the same as that shown in Fig. 5, the only difference being that in one the solid shaft rotates and causes rotation of the cage and drum while the sleeve or hollow shaft is held stationary and, in the other form, the functions of the two parts are reversed.

It is of course understood that the specific description set forth above may be departed from without departing from the spirit of this invention as set forth in this specification and the appended claims.

Having now described my invention, I claim:

1. In a pick-up for loose vegetable matter, in combination, a rotatable drum having peripheral apertures for the reception of spring fingers, a rotary cage within said drum, eccentrically positioned and having spring fingers mounted thereon and extending through said apertures, and driving means connected in driving relation with said cage to cause the fingers to rotate said drum.

2. A pick-up of the character indicated comprising a hollow drum having apertured ends and a substantially cylindrical wall, supporting means for the drum extending through substantially central appertures in said ends, openings in said wall, an eccentrically positioned cage extending longitudinally of said drum and supported for rotation therein about an axis substantially parallel to the axis of the drum, said cage having longitudinally extending finger supports, spring fingers yieldably but non-rotatably mounted on said finger supports and extending through the wall openings, said fingers, when the cage is rotated, engaging said wall and causing rotation of said drum, and driving means for said cage.

3. A pick-up for the purpose indicated comprising a drum mounted for rotation upon a substantially horizontal axis, a cage within the drum having an axis substantially parallel with the axis of the drum and eccentrically positioned with respect thereto, said cage comprising end members and finger supporting bars connecting the end members, spring fingers fixedly connected with said bars and loosely with said drum and actuated by rotation of said cage to cause rotation of said drum, and a rotary shaft by which the drum is supported and through which power is transmitted to cause rotation of the cage and the drum.

4. A pick-up comprising bearing supporting means, a bearing element supported thereby, a shaft supported by the bearing element and extending therethrough, a rotary drum, one end of which is supported by the bearing element, a support for the second end of the drum, a rotary cage eccentrically positioned within the drum with its axis held in a substantially fixed position with relation to the axis of the drum, spring fingers carried by the cage and extending through openings in the wall of the drum, said cage having an axle about which it rotates, and driving means for rotating said cage, said spring fingers, when the cage is rotated about its axis, engaging the edges of the openings in the wall of the drum and causing the drum to rotate.

5. In a pick-up, a power shaft, bearings to support said shaft, a sleeve surrounding said shaft and fixedly secured in one of said bearings, a drum rotatable about said sleeve, a bracket within said drum and fixedly mounted on said sleeve, a shaft rotatably mounted in said bracket, a cage carried by the second shaft and rotatable therewith, means connecting said shafts to cause the second shaft to be rotated by the first shaft, and spring fingers carried by said cage and extending through openings in the wall of said drum, said spring fingers transmitting power to the drum when the cage is rotated and thus causing rotation of the drum.

6. A pick-up comprising a power shaft, a drum connected to said shaft and freely rotatable with respect thereto, an axle within said drum and extending longitudinally thereof, driving means for rotating said axle, a cage fixedly connected to said axle for rotation therewith, and spring fingers projecting from said cage and rotating therewith, said spring fingers extending through the wall of said drum and causing rotation thereof when the cage shaft is rotated.

7. A pick-up comprising a fixed shaft, a sleeve surrounding said shaft and rotatable about same as an axle, driving means for rotating said sleeve, a drum having one end supported by the sleeve and freely rotatable thereon, an arm rigidly mounted on said shaft and held in a fixed position thereby, a shaft rotatably mounted in said arm, eccentrically with relation to the fixed shaft, a cage carried by the second shaft and rotating therewith, and spring fingers rigidly secured to the cage and rotating therewith, said spring fingers being connected to said drum to rotate same about the sleeve.

8. In a pick-up for loose vegetable matter, in combination, a rotatable drum having peripheral apertures, a rotary device within said drum and comprising fingers which protrude through said apertures, said device being eccentrically positioned with respect to said drum, and driving means for said rotary device to cause rotation thereof and thereby cause rotation of said drum by engagement of said fingers with the ends of said apertures.

GEORGE INNES.